US012608652B2

(12) United States Patent
Seth et al.

(10) Patent No.: US 12,608,652 B2
(45) Date of Patent: Apr. 21, 2026

(54) TUNING A TRAINED DATA RECORD MATCHING MODEL USING CUSTOMER DATA AND REPRESENTATION LEARNING

(71) Applicant: INTERNATIONAL BUSINESS MACHINES CORPORATION, Armonk, NY (US)

(72) Inventors: Abhishek Seth, Deoband (IN); Devbrat Sharma, Bangalore (IN); Mahendra Singh Kanyal, Banbasa (IN); Soma Shekar Naganna, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 566 days.

(21) Appl. No.: 18/120,099

(22) Filed: Mar. 10, 2023

(65) Prior Publication Data

US 2024/0303533 A1 Sep. 12, 2024

(51) Int. Cl.
*G06N 20/00* (2019.01)

(52) U.S. Cl.
CPC .................................... *G06N 20/00* (2019.01)

(58) Field of Classification Search
CPC .................................................... G06N 20/00
See application file for complete search history.

(56) References Cited

U.S. PATENT DOCUMENTS

| | | | | |
|---|---|---|---|---|
| 11,386,090 | B2 | 7/2022 | Seth et al. | |
| 11,514,321 | B1 * | 11/2022 | Chen | G06N 3/09 |
| 2005/0278139 | A1 | 12/2005 | Glaenzer et al. | |
| 2014/0358829 | A1 * | 12/2014 | Hurwitz | G06N 20/00 |
| | | | | 706/12 |
| 2020/0250576 | A1 * | 8/2020 | Jagota | G06F 18/29 |
| 2020/0250687 | A1 * | 8/2020 | Jagota | G06N 3/084 |
| 2020/0272845 | A1 * | 8/2020 | He | G06F 17/18 |
| 2021/0279604 | A1 | 9/2021 | Seth et al. | |
| 2021/0319026 | A1 * | 10/2021 | Seth | G06N 5/04 |
| 2021/0342353 | A1 * | 11/2021 | Jagota | G06F 16/24558 |
| 2022/0222489 | A1 * | 7/2022 | Liu | G06N 20/00 |
| 2022/0309047 | A1 | 9/2022 | Seth et al. | |
| 2022/0358607 | A1 * | 11/2022 | Guo | G06F 16/248 |

FOREIGN PATENT DOCUMENTS

CN          113569554          10/2021

OTHER PUBLICATIONS

Bogatu et al., "Cost-effective Variational Active Entity Resolution", Nov. 20, 2020, 12 pages.

(Continued)

*Primary Examiner* — Barbara M Level

(74) *Attorney, Agent, or Firm* — Seed Intellectual Property Law Group LLP

(57) ABSTRACT

A method, system, and computer program product are configured to create a tuned data record matching model by adjusting values of one or more parameters in a data record matching model based on a second training data set labeled at a data record level, wherein the data record matching model is initially trained using a first training data set labeled at an attribute level.

20 Claims, 6 Drawing Sheets

(56) References Cited

OTHER PUBLICATIONS

Mehta, "How is Maximum Likelihood Estimation used in machine learning?", https://analyticsindiamag.com/how-is-maximum-likelihood-estimation-used-in-machine-learning/, Apr. 9, 2022, 13 pages.

Anonymous, "IBM® Match 360 on Cloud Pak for Data", https://www.ibm.com/docs/en/cloud-paks/cp-data/4.0?topic=services-match-360-watson, May 26, 2022, 3 pages.

Anonymous, "Machine learning", Wikipedia, https://en.wikipedia.org/wiki/Machine_learning, archived Feb. 20, 2023, 34 pages.

Nguyen et al., "Fine-Tuning Pretrained Language Models With Label Attention for Biomedical Text Classification", Mar. 7, 2022, 5 pages.

* cited by examiner

100

201

Figure 4:
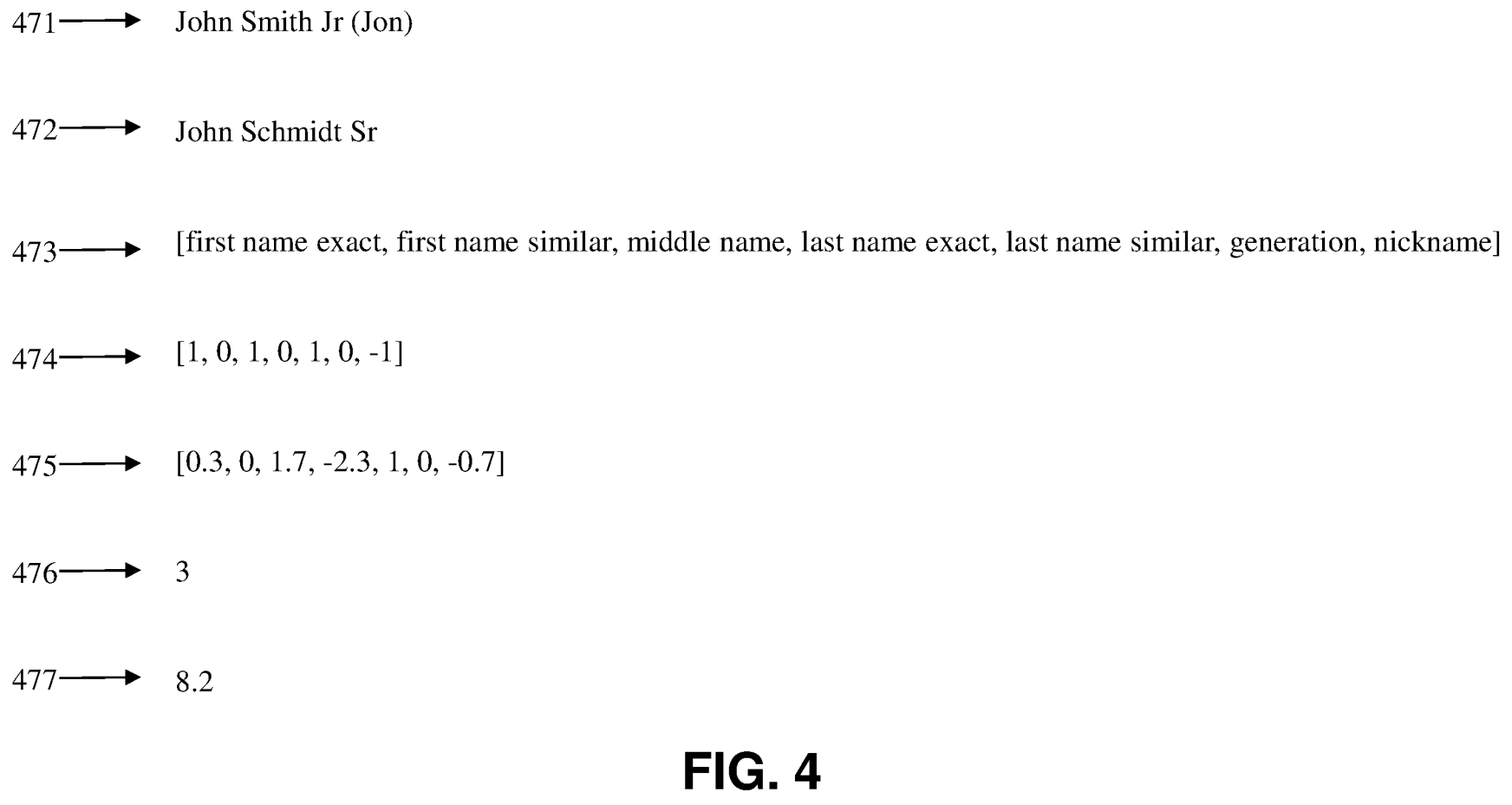

471 ⟶ John Smith Jr (Jon)

472 ⟶ John Schmidt Sr

473 ⟶ [first name exact, first name similar, middle name, last name exact, last name similar, generation, nickname]

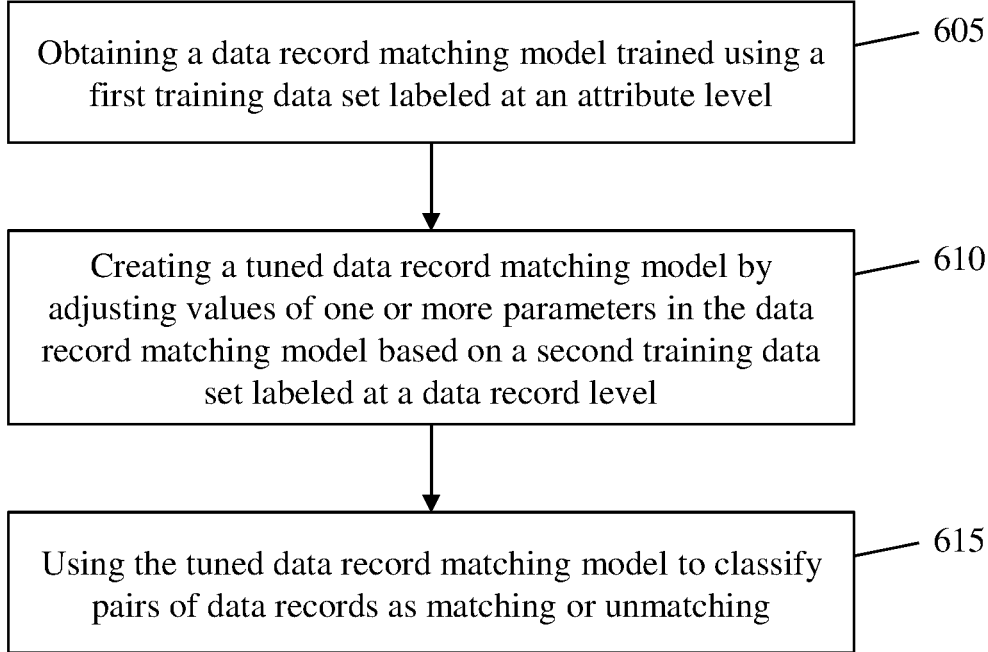

Obtaining a data record matching model trained using a first training data set labeled at an attribute level ⟋ 605

Creating a tuned data record matching model by adjusting values of one or more parameters in the data record matching model based on a second training data set labeled at a data record level ⟋ 610

Using the tuned data record matching model to classify pairs of data records as matching or unmatching ⟋ 615

FIG. 6

TUNING A TRAINED DATA RECORD MATCHING MODEL USING CUSTOMER DATA AND REPRESENTATION LEARNING

BACKGROUND

Aspects of the present invention relate generally to matching data records from different sources and, more particularly, to tuning a trained data record matching model using customer data and representation learning.

Master Data Management (MDM) based solutions work with enterprise data, and perform indexing, matching, and linking of data from different sources, creating a 360-degree view of customer data. Matching pairs of data records involves comparing different values of attributes (e.g., name, address, email, etc.) from each pair of records to determine if they match and should subsequently be linked, based on a series of mathematically derived statistical probabilities and complex weight tables. Attribute comparison functions check for a variety of matching conditions like exact match, edit distance, N-GRAM, phonetic, or partial matching. Scores are generated based on the outcome of these comparisons, and sub-scores from each attribute are combined based on statistically determined relative weights. Using statistically defined thresholds within the system, pairs of records are considered as matched, unmatched, or indeterminant and sent to clerical review.

Conventional data record matching models are trained using computer generated training data. Such models are not tailored to the data of a particular customer and, as a result, exhibit sub-optimal accuracy when used for matching customer data records.

SUMMARY

In a first aspect of the invention, there is a computer-implemented method including: obtaining, by a processor set, a data record matching model trained using a first training data set labeled at an attribute level; and creating, by the processor set, a tuned data record matching model by adjusting values of one or more parameters in the data record matching model based on a second training data set labeled at a data record level. Adjusting parameters of the matching model based on a training data set labeled at a data record level provides the advantage of more accurate matching when the model is used to match data records.

In another aspect of the invention, there is a computer program product including one or more computer readable storage media having program instructions collectively stored on the one or more computer readable storage media. The program instructions are executable to: create a tuned data record matching model by adjusting values of one or more parameters in a data record matching model based on a second training data set labeled at a data record level, wherein the data record matching model is initially trained using a first training data set labeled at an attribute level; and use the tuned data record matching model to classify pairs of data records as matching or unmatching. Adjusting parameters of the matching model based on a training data set labeled at a data record level provides the advantage of more accurate matching when the model is used to match data records.

In another aspect of the invention, there is a system including a processor set, one or more computer readable storage media, and program instructions collectively stored on the one or more computer readable storage media. The program instructions are executable to: create a tuned data record matching model by adjusting values of one or more parameters in a data record matching model based on a second training data set labeled at a data record level, wherein the data record matching model is initially trained using a first training data set labeled at an attribute level; and provide the tuned data record matching model to a customer for the customer to use the tuned data record matching model to classify pairs of data records as matching or unmatching. Adjusting parameters of the matching model based on a training data set labeled at a data record level provides the advantage of more accurate matching when the model is used to match data records.

In embodiments, the adjusting the values of the one or more parameters is performed using a two-phase learning process. In embodiments, a first phase of the two-phase learning process comprises determining adjusted distance measures using labels of the second training data set as target outputs, and a second phase of the two-phase learning process comprises determining adjusted values of the comparison coefficient vectors using the adjusted distance measures as target outputs. In this manner, embodiments provide the advantage of a matching model that is finely tuned to determine distances (e.g., similarity) between attributes of data records.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 4 shows exemplary values of elements of the trained matching model in accordance with aspects of the present invention.

FIG. 6 shows a flowchart of an exemplary method in accordance with aspects of the present invention.

DETAILED DESCRIPTION

Figure 1:
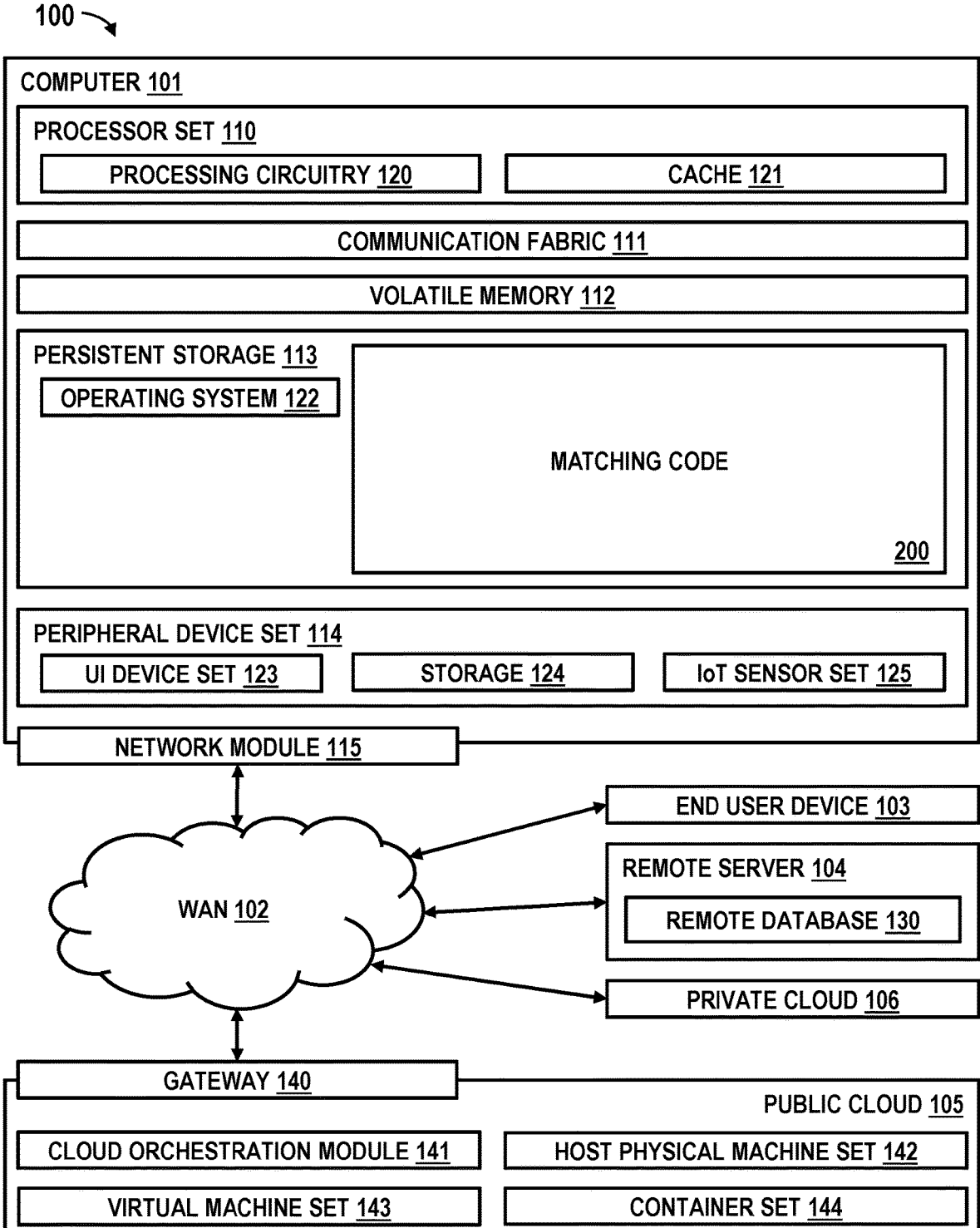
FIG. 1 depicts a computing environment according to an embodiment of the present invention.

Aspects of the present invention relate generally to matching data records from different sources and, more particularly, to tuning a trained data record matching model using customer data and representation learning. Implementations of the invention optimize an already trained data record matching model by adjusting parameters in the model based on customer data. By adjusting parameters of the model using actual customer data, the model is optimized for this particular customer and provides more accurate matching when used with other data of this customer.

The process of entity resolution as described herein involves matching data records that come from different data sources. The data records may be records from different databases that a customer wishes to consolidate, e.g., into a single database. Each data record includes one or more attributes, such as name, address, email, etc. Matching two data records may involve comparing corresponding attribute values contained in the two data records and determining whether these two data records should be deemed as matching or unmatching based on this comparison. The attributes values may be compared using a feature vector technique, with different feature vectors being defined for different attributes. Weights may be assigned to dimensions of a particular feature vector based on training using labeled training data. The weights may be determined using logistic regression and the labeled training data. For an incoming data record comparison (e.g., a comparison of two data records), a feature vector is generated for each attribute, the weights are applied to the appropriate values of the feature vectors, and a respective distance measure is determined for each attribute. The distance measure represents a quantification of a similarity between the attribute values of a particular attribute of the two data records being compared. A similarity score for each attribute may be determined based on the distance measure for the particular attribute. The similarity score may be determined using a look up table. An aggregate similarity score for the pair of data records being compared may be determined by summing the respective similarity scores of the respective attributes. The two data records being compared may then be labeled as matching or unmatching based on the aggregate similarity score. In this manner, the data records are labeled at the record level.

Data record matching models (also called matching models and matching engines) are conventionally trained using computer generated training data that is not specific to any particular end user of the model. These models are not tailored to the data of a particular customer and, as a result, exhibit sub-optimal accuracy when used with actual customer data. To facilitate the migration of existing MDM customers to next generation matching models, there is a need to provide a service through data record pair analysis that can automatically tune the matching model based on customer feedback. Implementations of the invention address this need by providing a matching model in which the determined weights are maintained and, for a given auto-link threshold, the values of feature vector coefficients (e.g., comparison coefficients) are adjusted using machine learning with labeled customer data pairs as training data. In this manner, the customer will not only have the auto-link threshold as a governing parameter used in the matching, but can also adjust the values of feature vector coefficients used in the matching model according to their specific needs.

Conventional matching models may employ a logistic regression model for each feature (e.g., attribute) to determine the distance measure. These logistic regression models are trained using labeled data pairs at the attribute level, but not at the data record level. For example, a logistic regression model for a "name" attribute may be trained using labeled data pairs of name values. These logistic regression models are trained using a data set of computer generated, labeled matched and unmatched data entries, to prevent overfitting the model weights. A data generator creates matched pairs of entries having varying degrees of matched and unmatched comparison features, as well as pairs of completely unmatched pairs of data. For example, name pairs including matched, Amanda Smith: Amanda Smith, partially matched: Chris Jackson: C. Jackson, and unmatched, Olen Brown: Brandon Wilson, are provided for training the logistic regression model for the name attribute. However, actual customer data is only labeled at the data record level, and not at the attribute level. Therefore, the actual customer data does not provide for direct supervision to tune these the logistic regression models that were initially trained using computer generated training data labeled at the attribute level. Implementations of the invention address this problem by providing a two-phase learning approach for tuning these the logistic regression models. In embodiments, the first phase adjusts the feature distances using customer data labeled at the data record level as a supervising agent. In embodiments, the second phase adjusts the values of feature vector coefficients (e.g., comparison coefficients) using the adjusted feature distances as the desired output. In this manner, a matching model that is initially trained using computer generated training data labeled at the attribute level is improved by tuning the model for a particular customer by adjusting values of parameters of the model based on customer data labeled at the data record level.

Implementations of the invention thus provide a technical improvement to the technical problem of matching models that are trained with generic data, which have sub-optimal accuracy when used with real customer data. The problem and the improvement are technical in nature because both involve using computer-based matching models that include machine learning models. The improvement is also technical because embodiments utilize machine learning techniques to determine the adjusted values of the parameters of the matching model. Embodiments have the practical application of providing a customer with a more accurate matching model with which to match the customer's data records.

Implementations of the invention may utilize data including: provided matching labels (e.g., MDM matching labels) corresponding to some fixed number of pairs compared using a prior pair analysis; predicted matching labels for the same number of pairs from a matching engine; attribute wise distances corresponding to each pair compared with the matching engine; feature vectors and the corresponding coefficients for each of the attributes of compared pairs from the matching engine; and an auto-link threshold value and distance to weight lookup tables. Embodiments may utilize this data to automatically tune the feature vector coefficients (e.g., comparison coefficients) to enhance the output from the matching engine considering the provided matching labels as ground truth.

Implementations of the invention utilize a two-phase learning process. In embodiments, the first phase comprises tuning the feature wise distances generated by a matching engine using the provided matching labels as ground truth. The first phase may include: for each pair of data records, constructing an input vector by considering the feature wise distances as vectors; and, using the provided matching labels as ground truth, training a classification model to adjust the attribute wise weights based on the correlation they have with the predicted matching label. In this manner, the first phase generates adjusted feature wise distances to generate matching labels consistent with the provided matching labels. Embodiments train a single model at the pair level in the first phase. In embodiments, the second phase comprises tuning the feature vector coefficients using the updated feature wise distances as the expected output. The second phase may include: for each attribute of each pair, training a regression model to adjust the feature vector coefficients (e.g., comparison coefficients) using the matching engine-based feature vectors as input and using the adjusted feature wise distances as truth (e.g., target output). Embodiments train one regression model per attribute in the second phase, such that there may be multiple models at a pair level comparison.

According to an aspect of the invention, there is a system, method, and computer program product for tuning a matching engine's comparison coefficients based on supplied labeled data in entity resolution systems. The system, method, and computer program product may comprise tuning similarity measures of attribute comparison methods using representational learning based on the discrepancy between system generated matching outcomes and supplied outcomes. The system, method, and computer program product may comprise optimizing the comparison feature vector coefficients (e.g., comparison coefficients) for every attribute based on newly learned distance measures. The learning may be performed using a regression method that works with multiple variables, e.g., multi-variate regression or other similar machine learning technique.

It should be understood that, to the extent implementations of the invention collect, store, or employ personal information provided by or obtained from individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as matching code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers.

IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
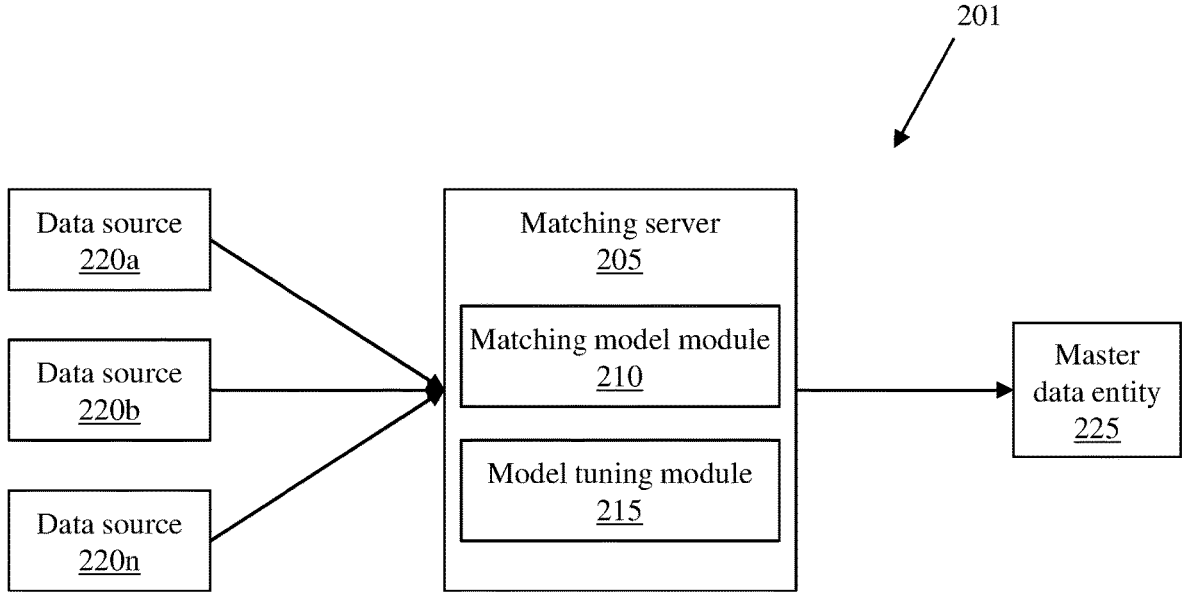
FIG. 2 shows a block diagram of an exemplary environment in accordance with aspects of the present invention.

FIG. 2 shows a block diagram of an exemplary environment 201 in accordance with aspects of the invention. In embodiments, the environment 201 includes a matching server 205 that receives data from data sources 220*a*, 220*b*, . . . , 220*n*, and creates a master data entity 225 by consolidating matching data records contained in the data sources 220*a-n*. The data sources 220*a-n* comprise disparate data sources and may include, for example, customer relationship management (CRM) systems, web applications, marketing lists, and other databases. The master data entity

225 may comprise a database or list of data consolidated from the data sources 220*a-n*, which provides a 360-degree view of the customer data contained in the data sources 220*a-n*.

In one example, the matching server 205 comprises one or more instances of the computer 101 of FIG. 1. In another example, the matching server 205 comprises one or more container or virtual machines running on one or more instances of the computer 101 of FIG. 1. The data sources 220*a-n* may comprise instances of remote database 130 of FIG. 1. The matching server 205 may obtain data from the data sources 220*a-n* via network communication, such as through WAN 102 of FIG. 1.

In embodiments, the matching server 205 of FIG. 2 comprises matching model module 210 and model tuning module 215, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The matching server 205 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, the matching model module 210 implements a trained matching model that is configured to compare data record pairs from the data sources 220*a-n* and classify (e.g., label) the data record pairs as either matching or unmatching based on the comparison. An exemplary operation of the matching model is described at FIG. 3.

In accordance with aspects of the invention, the model tuning module 215 is configured to tune the matching model by adjusting values of parameters of the matching model. In embodiments, the model tuning module 215 uses a two-phase learning approach to adjust the values of parameters of the matching model. In embodiments, the first phase comprises using machine learning to adjust distance measures determined by the matching model to generate outputs that are consistent with labeled pairs of customer data records. In embodiments, the second phase comprises using machine learning to adjust values of comparison coefficients used in the matching model such that the matching model generates the adjusted distance measures.

Figure 3:
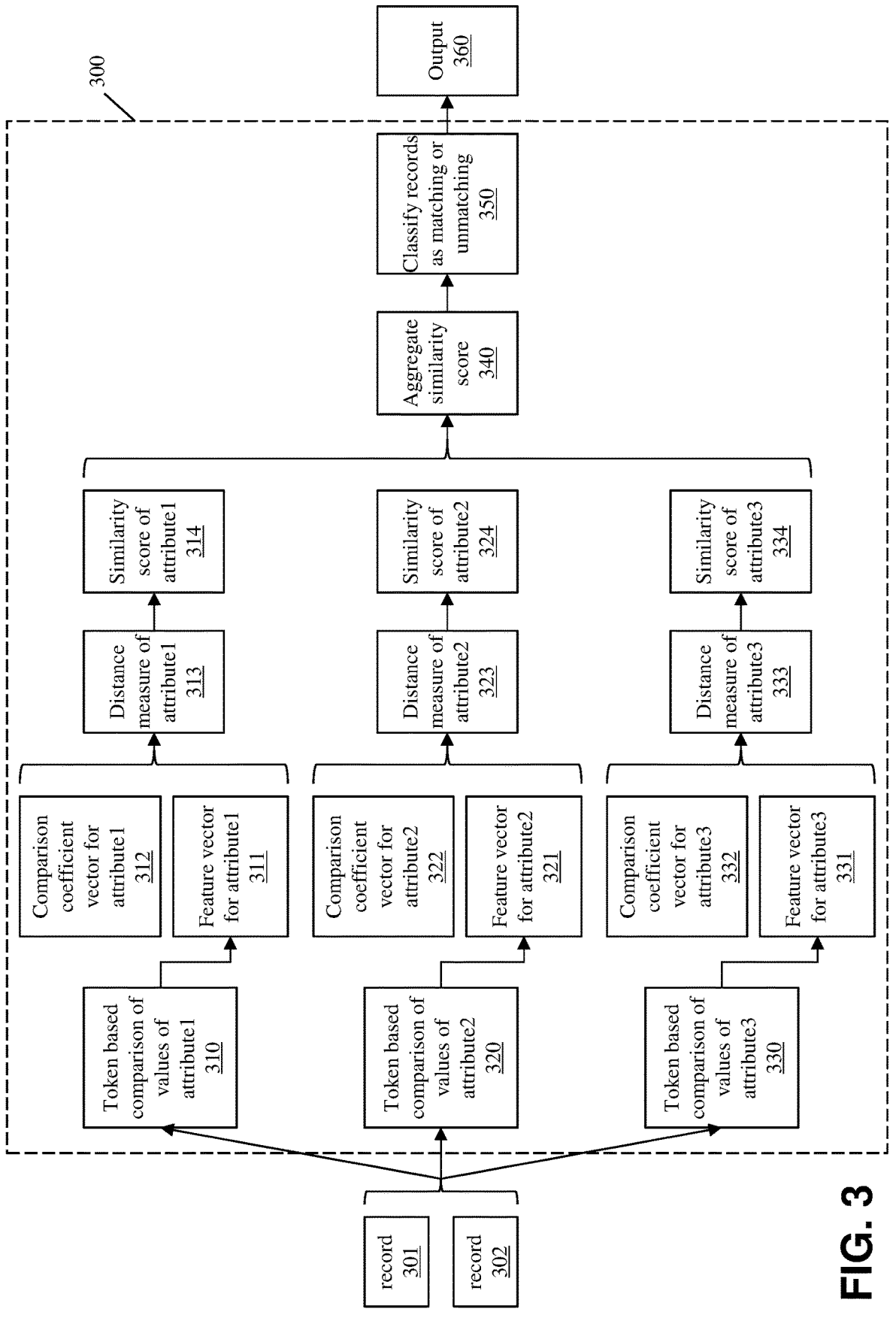
FIG. 3 shows a diagram that illustrates operation of a trained matching model in accordance with aspects of the present invention.

FIG. 3 shows a diagram that illustrates operation of a trained matching model 300 implemented by the matching model module 210 of FIG. 2 in accordance with aspects of the present invention. In embodiments, the model 300 receives record 301 and record 302 from different ones of the data sources 220*a-n* of FIG. 2. As is understood in the art, a data record includes one or more attributes (e.g., name, address, email) with each attribute having an attribute value (e.g., John Doe, 555 Broad Street, JohnDoe@email.com). In this example, record 301 and record 302 each comprise a respective data record having three attributes: attribute1, attribute2, attribute3. Implementations of the invention are not limited to data records having three attributes, and data records having other number of attributes may be used.

At block 310, the model performs a token-based comparison of the value of attribute1 of record 301 and the value of attribute1 of record 302. Based on this comparison, the model 300 generates a feature vector 311 for attribute1 for the records 301, 302. Generating the feature vector 311 comprises populating the vector with numeric values determined based on one or more scoring algorithms and the comparison at step 310. The model 300 uses the feature vector 311 and a comparison coefficient vector 312 of attribute1 to determine a distance measure 313 of attribute1 for the records 301, 302. The model 300 uses the distance measure 313 to determine a similarity score 314 of attribute1 for the records 301, 302.

At block 320, the model performs a token-based comparison of the values of attribute2 of record 301 and the values of attribute2 of record 302. Based on this comparison, the model 300 generates a feature vector 321 for attribute2 for the records 301, 302. Generating the feature vector 321 comprises populating the vector with numeric values determined based on one or more scoring algorithms and the comparison at step 320. The model 300 uses the feature vector 321 and a comparison coefficient vector 322 of attribute2 to determine a distance measure 323 of attribute2 for the records 301, 302. The model 300 uses the distance measure 323 to determine a similarity score 324 of attribute2 for the records 301, 302.

At block 330, the model performs a token-based comparison of the values of attribute3 of record 301 and the values of attribute3 of record 302. Based on this comparison, the model 300 generates a feature vector 331 for attribute3 for the records 301, 302. Generating the feature vector 331 comprises populating the vector with numeric values determined based on one or more scoring algorithms and the comparison at step 330. The model 300 uses the feature vector 331 and a comparison coefficient vector 332 of attribute3 to determine a distance measure 333 of attribute3 for the records 301, 302. The model 300 uses the distance measure 333 to determine a similarity score 334 of attribute3 for the records 301, 302.

The model 300 determines an aggregate similarity score 340 for the records 301, 302 based on the similarity scores 314, 324, 334. In one example, the aggregate similarity score 340 is a sum of the similarity scores 314, 324, 334. Other algorithms may be used to determine the aggregate similarity score 340 for the records 301, 302 based on the similarity scores 314, 324, 334.

At block 350, the model 300 classifies (e.g., labels) the records 301, 302 as matching or matching based on the aggregate similarity score 340. In one example, the model 300 compares the aggregate similarity score 340 to a predefined threshold (e.g., an auto-link threshold value). In this example, if the aggregate similarity score 340 is less than the threshold, then the model 300 classifies the records 301, 302 as unmatching. In this example, if the aggregate similarity score 340 is greater than the threshold, then the model 300 classifies the records 301, 302 as matching.

At block 360, the model 300 outputs data indicating the classification determined at block 350.

FIG. 4 shows exemplary values that illustrate elements shown in FIG. 3 in accordance with aspects of the present invention. In this example, as in the example of FIG. 3, each record 301, 302 includes three attributes: attribute1, attribute2, attribute3. In this example, attribute1 is a name attribute. In FIG. 4, number 471 is an example of the attribute value (e.g., data) of attribute1 of the first record

301, and number 472 is an example of the attribute value (e.g., data) of attribute2 of the second record 302.

In FIG. 4, number 473 shows an example of a feature vector definition for attribute1. In this example, the feature vector definition includes seven dimensions: first name exact, first name similar, middle name, last name exact, last name similar, generation, nickname. In embodiments, the model 300 stores a respective feature vector definition for each different attribute. The different feature vector definitions may have different numbers of dimensions.

In FIG. 4, number 474 shows an example of a feature vector 311 generated based on a comparison of the values 471, 472 of attribute1 for these records 301, 302. In embodiments, and as described with respect to FIG. 3, the model 300 generates the feature vector 311 by determining a respective numeric value for each different dimension of the feature vector definition, wherein the numeric values are determined based on one or more scoring algorithms and a token-based comparison of the values 471, 472.

In FIG. 4, number 475 shows an example of the comparison coefficient vector 312 of attribute1 for this model 300. The comparison coefficient vector 312 includes a number of coefficients equal to the number of dimensions of the feature vector definition for the attribute. In this example, the feature vector definition for attribute1 has seven dimensions, and the comparison coefficient vector 312 has seven coefficients: 0.3, 0, 1.7, −2.3, 1, 0, −0.7. In accordance with aspects of the invention, the values of the coefficients in the comparison coefficient vector 312 are initially determined using a logistic regression model and labeled pairs of computer generated data entries for attribute1. In this example, attribute1 is a name attribute, and a logistic regression model for this attribute is trained using pairs of name values in which each pair is labeled as either matching or unmatching. In embodiments, a data generator creates a set of training data comprising matched pairs of entries having varying degrees of matched and unmatched comparison features, as well as pairs of completely unmatched pairs of data. Each of these pairs is classified (e.g., labeled) as either matching or unmatching. Logistic regression is used with this training data to generate a logistic regression model that receives values of attribute1 as input and that outputs a label based on the input. The coefficients in the comparison coefficient vector 312 are coefficients of the logistic regression model determined in this manner.

In FIG. 4, number 476 shows an example of a determined distance measure 313 of attribute1 for the records 301, 302. As described with respect to FIG. 3, the model 300 determines the distance measure 313 using the feature vector 311 and the comparison coefficient vector 312. In the example of FIG. 4, the distance measure 476 value is determined using a dot product of the feature vector 474 and the comparison coefficient vector 475. Other algorithms may be used to determine a value of a distance measure based on the feature vector and the comparison coefficient vector.

In FIG. 4, number 477 shows an example of a determined similarity score 314 of attribute1 for the records 301, 302. As described with respect to FIG. 3, the model 300 determines the similarity score 314 based on the distance measure 313. In embodiments, the model 300 comprises a lookup table that provides a value of a similarity score based on a given value of the distance measure. The values included in the lookup table may be determined based on statistical weights and/or frequency correction.

As described herein, the model 300 includes a respective feature vector definition and comparison coefficient vector for each different attribute. Number 475 in FIG. 4 shows an example of one comparison coefficient vector for one attribute. As described herein, the model 300 is initially trained using a first set of training data that is labeled at the attribute level and that is computer generated (i.e., not specific to a particular customer). As a result, the values in the respective comparison coefficient vectors are determined using this training data, and are not finely tuned to the data of any one customer. This may cause the model 300 to produce sub-optimal outputs when used with actual data of a customer. To address this shortcoming, implementations of the invention adjust values in the comparison coefficient vectors (e.g., 312, 322, 332) of the initially trained model 300 using machine learning with a second set of training data that is labeled at the data record level and that is specific to a particular customer. In embodiments, the model tuning module 215 uses a two-phase learning approach to adjust the values in the comparison coefficient vectors (e.g., 312, 322, 332) of the initially trained model 300. In embodiments, the first phase comprises using machine learning to adjust distance measures (e.g., 313, 323, 333) determined by the model 300 to generate outputs 360 that are consistent with labeled pairs of customer data records. In embodiments, the second phase comprises using machine learning to adjust values of the comparison coefficients vectors (e.g., 312, 322, 332) used in the model 300 such that the adjusted model, using the adjusted comparison coefficients vectors, generates the adjusted distance measures for the labeled pairs of customer data records.

In embodiments, the second set of training data comprises data record pairs in which each pair is labeled as matching or unmatching. Each data record pair includes two data records that have the same attributes for which the model 300 is trained. For example, when the model 300 is trained using three attributes (e.g., attribute1, attribute2, attribute3), each data record in the data record pairs of the second set of training data also has the same three attributes (e.g., attribute1, attribute2, attribute3). In embodiments, the data record pairs are obtained from actual data sources of the customer and are labeled manually as either matching or unmatching.

In embodiments, in the first phase of the learning process, for each data record pair of the second set of training data, the model tuning module 215 uses the initially trained model 300 to generate distance measures (e.g., 313, 323, 333) in the manner described herein with respect to FIG. 3. For each data record pair of the second set of training data, the model tuning module 215 generates a distance vector DV=[D1, D2, . . . , DN] where the values of D1-DN are the determined distance measure (e.g., 313, 323, 333) for this data record pair. In this manner, for each data record pair of the second set of training data there exists a distance vector DV and a ground truth label (e.g., the label provided with this data record pair, e.g., by the customer). In embodiments, the model tuning module 215 uses supervised machine learning to train a classification model using the distance vectors DV as inputs and the ground truth labels as target outputs. In embodiments, the classification model is trained to adjust the distance measures in the distance vector (DV) for a data record pair such that a label (e.g., output 360) generated using the adjusted distance measures with the model 300 matches the ground truth label for this data record pair. In one example, the classification model may be trained using a maximum likelihood estimation algorithm to determine parameters of the classification model. In embodiments, the result of the first phase of the learning process is a respective adjusted distance vector DV'=[D1', D2', . . . , DN'] for each data record pair of the second set of training data, where the values D1'-DN' are the adjusted distance measures determined using the classification model.

In embodiments, in the second phase of the learning process, the model tuning module 215 uses the determined adjusted distance measures (from the first phase) to train a regression model for each attribute to adjust the values of the comparison coefficient vector for the attribute. For example, for the model 300 shown in FIG. 3, the model tuning module 215 trains: a first regression model for attribute1 that is used to adjust the values of the comparison coefficient vector (e.g., 312) for attribute1; a second regression model for attribute2 that is used to adjust the values of the comparison coefficient vector (e.g., 322) for attribute2; and a third regression model for attribute3 that is used to adjust the values of the comparison coefficient vector (e.g., 332) for attribute3. In embodiments, the training data for the regression model for a particular attribute includes, for each data record pair of the second set of training data, the feature vector (e.g., 311) determined for this data record pair and the adjusted distance measure for this data record pair for this attribute (e.g., from the first phase). The feature vectors are used as inputs and the adjusted distance measures are used as target outputs. In embodiments, the regression model is trained to adjust the values of the comparison coefficient vector (e.g., 312) of this particular attribute such that a distance measure generated using the feature vector for this this data record and the adjusted values of the comparison coefficient vector (e.g., in the manner described at block 313) matches the adjusted distance measure for this attribute for this this data record pair (e.g., from the first phase). In embodiments, the result of the second phase of the learning process is an adjusted comparison coefficient vector for each attribute of the model 300.

Figure 5:
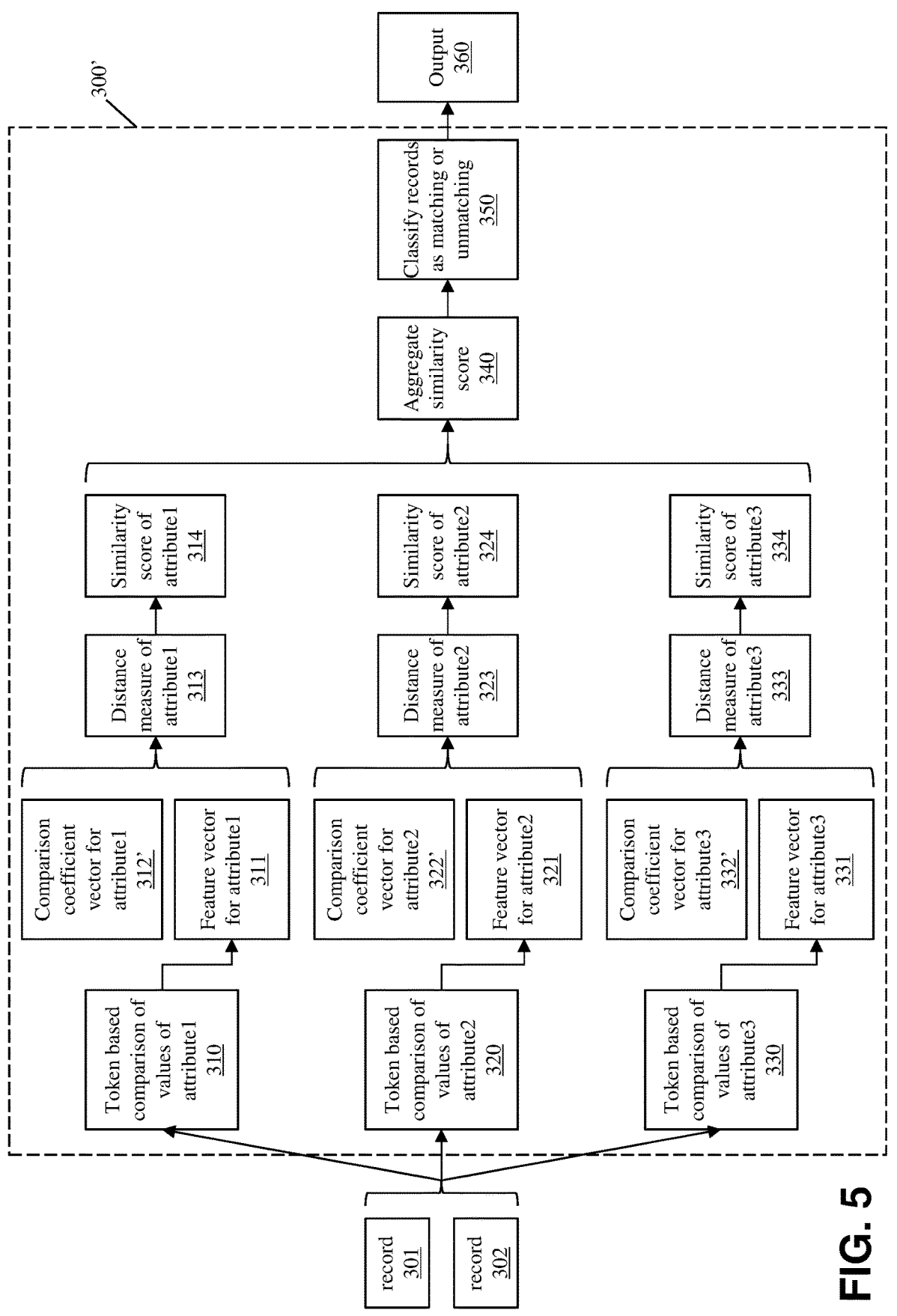
FIG. 5 shows a tuned matching model in accordance with aspects of the present invention.

FIG. 5 shows a tuned matching model 300' in accordance with aspects of the present invention. In embodiments, the tuned matching model 300' comprises the initial model 300 with adjusted comparison coefficient vectors 312', 322', 332' (determined in the second phase of the learning process) substituted in place of the initial comparison coefficient vectors 312, 322, 332. As described herein the adjusted comparison coefficient vectors 312', 322', 332' contain values of coefficients that differ from the values contained in the corresponding initial comparison coefficient vectors 312, 322, 332. The tuned matching model 300' may be used to perform matching of pairs of data records in a manner similar to that described with respect to FIG. 3.

FIG. 6 shows a flowchart of an exemplary method in accordance with aspects of the present invention. Steps of the method may be carried out in the environment of FIG. 2 and are described with reference to elements depicted in FIG. 2.

At step 605, the system obtains a data record matching model trained using a first training data set labeled at an attribute level. In embodiments, the data record matching model comprises matching model 300 in which the comparison coefficient vectors (e.g., 312, 322, 332) are trained using a first training data set labeled at an attribute level. In embodiments, the first training data set comprises computer generated and labeled pairs of attribute values for each different attribute in the model. In embodiments, the model tuning module 215 obtains the model from the matching model module 210 or from another computing device that stores data defining the model. In embodiments, the obtaining may comprise obtaining data that defines the model.

At step 610, the system creates a tuned data record matching model by adjusting values of one or more parameters in the data record matching model based on a second training data set labeled at a data record level. In embodiments, the model tuning module 215 creates the tuned data record matching model 300' by adjusting values of one or more parameters in the matching model 300. In embodiments, the one or more parameters comprise comparison coefficient vectors (e.g., 312, 322, 332). In embodiments, the data record matching model uses a respective one of the comparison coefficient vectors (e.g., one of 312, 322, 332) with a respective feature vector (e.g., one of 311, 321, 331) to determine a distance measure (e.g., one of 313, 323, 333) of a respective attribute of a pair of data records. In embodiments, the first training data set comprises computer generated and labeled pairs of attribute values, and the second training data set comprises labeled pairs of customer data records.

In accordance with aspects of the present invention, the adjusting the values of the one or more parameters is performed using a two-phase learning process. In embodiments, a first phase of the two-phase learning process comprises determining adjusted distance measures using labels of the second training data set as target outputs, and a second phase of the two-phase learning process comprises determining adjusted values of the comparison coefficient vectors using the adjusted distance measures as target outputs. In embodiments, the first phase comprises training a classification model that is used to determine the adjusted distance measures, and the second phase comprises training plural regression models, wherein respective ones of the plural regression models are used to determine the adjusted values of respective ones of the comparison coefficient vectors.

At step 615, the system uses the tuned data record matching model to classify pairs of data records as matching or unmatching. In embodiments, the matching model module 210 uses the tuned matching model 300' to classify (e.g., label) pairs of data records (e.g., 301 and 302) as one of matching and unmatching. The using may comprise providing access to the tuned matching model to a user and running the tuned matching model in response to a request from the user. The access may be provided via a computer application interface. For example, the system may provide an application interface to a user, receive a user request to consolidate data from two or more data sources via the application interface, and run the tuned matching model in response to the request. The using may comprise providing the tuned data record matching model to a user (e.g., customer) for the user to use the tuned data record matching model to classify pairs of data records as matching or unmatching. For example, the system may deliver the tuned matching model to the user (e.g., the form of a computer program) so that the user can save and run the tuned matching model on a computing device other than the matching server 205.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method which provides an accurate matching model which is tuned by adjusting values based on customer data, comprising:

training, by a processor set, a classification model to determine adjusted distance measures using distance vectors as inputs and labels of a second training data set as target outputs;

training, by the processor set, at least one regression model to determine an adjusted comparison coefficient vector for each attribute using the determined adjusted distance measures from the trained classification model;

obtaining, by the processor set, a data record matching model trained using a first training data set labeled at an attribute level; and creating, by the processor set, a tuned data record matching model by adjusting values of one or more parameters in the data record matching model based on the second training data set labeled at a data record level.

2. The method of claim 1, wherein the one or more parameters comprise comparison coefficient vectors.

3. The method of claim 2, wherein the data record matching model uses a respective one of the comparison coefficient vectors with a respective feature vector to determine a distance measure of a respective attribute of a pair of data records.

4. The method of claim 2, wherein the adjusting the values of the one or more parameters is performed using a two-phase learning process.

5. The method of claim 4, wherein:

a first phase of the two-phase learning process comprises determining the adjusted distance measures using the labels of the second training data set as the target outputs; and a second phase of the two-phase learning process comprises determining adjusted values of the comparison coefficient vectors using the adjusted distance measures as the target outputs.

6. The method of claim 5, wherein:

the first phase comprises training the classification model that is used to determine the adjusted distance measures; and the second phase comprises training plural regression models, wherein respective ones of the plural regression models are used to determine the adjusted values of respective ones of the comparison coefficient vectors.

7. The method of claim 1, wherein:
the first training data set comprises computer generated and labeled pairs of attribute values; and
the second training data set comprises labeled pairs of customer data records.

8. The method of claim 1, further comprising using the tuned data record matching model to classify pairs of data records as matching or unmatching.

9. A computer program product which provides an accurate matching model which is tuned by adjusting values based on customer data, the computer program product comprising one or more computer readable storage media having program instructions collectively stored on the one or more computer readable storage media, the program instructions executable to:
    train a classification model to determine adjusted distance measures using distance vectors as inputs and labels of a second training data set as target outputs;
    train at least one regression model to determine an adjusted comparison coefficient vector for each attribute using the determined adjusted distance measures from the trained classification model;
    create a tuned data record matching model by adjusting values of one or more parameters in a data record matching model based on the second training data set labeled at a data record level, wherein the data record matching model is initially trained using a first training data set labeled at an attribute level; and
    use the tuned data record matching model to classify pairs of data records as matching or unmatching.

10. The computer program product of claim 9, wherein the one or more parameters comprise comparison coefficient vectors.

11. The computer program product of claim 10, wherein the data record matching model uses a respective one of the comparison coefficient vectors with a respective feature vector to determine a distance measure of a respective attribute of a pair of data records.

12. The computer program product of claim 10, wherein:
the adjusting the values of the one or more parameters is performed using a two-phase learning process;
a first phase of the two-phase learning process comprises the determining adjusted distance measures using the labels of the second training data set as the target outputs; and
a second phase of the two-phase learning process comprises determining adjusted values of the comparison coefficient vectors using the adjusted distance measures as the target outputs.

13. The computer program product of claim 12, wherein:
the first phase comprises training the classification model that is used to determine the adjusted distance measures; and
the second phase comprises training plural regression models, wherein respective ones of the plural regression models are used to determine the adjusted values of respective ones of the comparison coefficient vectors.

14. The computer program product of claim 9, wherein:
the first training data set comprises computer generated and labeled pairs of attribute values; and
the second training data set comprises labeled pairs of customer data records.

15. A system which provides an accurate matching model which is tuned by adjusting values based on customer data, the system comprising:
    a processor set, one or more computer readable storage media, and program instructions collectively stored on the one or more computer readable storage media, the program instructions executable to:
    train a classification model to determine adjusted distance measures using distance vectors as inputs and labels of a second training data set as target outputs;
    train at least one regression model to determine an adjusted comparison coefficient vector for each attribute using the determined adjusted distance measures from the trained classification model;
    create a tuned data record matching model by adjusting values of one or more parameters in a data record matching model based on the second training data set labeled at a data record level, wherein the data record matching model is initially trained using a first training data set labeled at an attribute level; and
    provide the tuned data record matching model to a customer for the customer to use the tuned data record matching model to classify pairs of data records as matching or unmatching.

16. The system of claim 15, wherein the one or more parameters comprise comparison coefficient vectors.

17. The system of claim 16, wherein the data record matching model uses a respective one of the comparison coefficient vectors with a respective feature vector to determine a distance measure of a respective attribute of a pair of data records.

18. The system of claim 16, wherein:
the adjusting the values of the one or more parameters is performed using a two-phase learning process;
a first phase of the two-phase learning process comprises determining the adjusted distance measures using the labels of the second training data set as the target outputs; and
a second phase of the two-phase learning process comprises determining adjusted values of the comparison coefficient vectors using the adjusted distance measures as the target outputs.

19. The system of claim 18, wherein:
the first phase comprises training the classification model that is used to determine the adjusted distance measures; and
the second phase comprises training plural regression models, wherein respective ones of the plural regression models are used to determine the adjusted values of respective ones of the comparison coefficient vectors.

20. The system of claim 15, wherein:
the first training data set comprises computer generated and labeled pairs of attribute values; and
the second training data set comprises labeled pairs of customer data records.

* * * * *